United States Patent
Kim

(10) Patent No.: US 10,484,525 B2
(45) Date of Patent: *Nov. 19, 2019

(54) PERSONAL MEDIA SYSTEM INCLUDING BASE STATION AND WIRELESS EARBUD

(71) Applicant: PINN, INC., Tustin, CA (US)

(72) Inventor: Seung Jin Kim, Irvine, CA (US)

(73) Assignee: PINN, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,736

(22) Filed: Sep. 1, 2017

(65) Prior Publication Data
US 2017/0374184 A1    Dec. 28, 2017

Related U.S. Application Data

(63) Continuation of application No. 15/625,935, filed on Jun. 16, 2017, which is a continuation of application No. PCT/US2016/025936, filed on Apr. 4, 2016.
(Continued)

(51) Int. Cl.
*H04M 1/60* (2006.01)
*H04R 1/10* (2006.01)
(Continued)

(52) U.S. Cl.
CPC .......... *H04M 1/6066* (2013.01); *G06F 3/165* (2013.01); *H04M 1/05* (2013.01); *H04M 1/7253* (2013.01); *H04R 1/1016* (2013.01); *H04R 1/1025* (2013.01); *H04R 1/1041* (2013.01); *H04M 2201/38* (2013.01); *H04M 2250/02* (2013.01); *H04M 2250/22* (2013.01);
(Continued)

(58) Field of Classification Search
CPC combination set(s) only.
See application file for complete search history.

(56) References Cited

U.S. PATENT DOCUMENTS

| 5,881,149 A | 3/1999 | Weatherill |
|---|---|---|
| 6,424,820 B1 | 7/2002 | Burdick et al. |

(Continued)

FOREIGN PATENT DOCUMENTS

| CN | 2489520 Y | 5/2002 |
|---|---|---|
| CN | 2783637 Y | 5/2006 |

(Continued)

OTHER PUBLICATIONS

Archived cop of website, http://mypinn.com in 4 pages. Website http://mypinn.com, was first published on May 5, 2016 and archived on Jun. 26, 2016. Archived copy was downloaded from https://web.archive.org/web/20160626155438/http://mypinn.com/ on Apr. 13, 2017.

(Continued)

*Primary Examiner* — Zhitong Chen
(74) *Attorney, Agent, or Firm* — Knobbe Martens Olson & Bear LLP

(57) ABSTRACT

The disclosure provides a personal media system including a base station and a wireless earbud. The personal media system interacts with a smartphone for wireless pairing. The base station has a connection hole to receive the wireless earbud. When the wireless earbud is plugged into the connection hole, the base station and wireless earbud form an integrated body.

29 Claims, 4 Drawing Sheets

Related U.S. Application Data

(60) Provisional application No. 62/142,978, filed on Apr. 3, 2015.

(51) Int. Cl.
  *G06F 3/16* (2006.01)
  *H04M 1/05* (2006.01)
  *H04M 1/725* (2006.01)

(52) U.S. Cl.
  CPC .... *H04R 2205/021* (2013.01); *H04R 2420/01* (2013.01); *H04R 2420/07* (2013.01); *H04R 2499/11* (2013.01)

(56) References Cited

U.S. PATENT DOCUMENTS

| | | | |
|---|---|---|---|
| 6,473,630 | B1 | 10/2002 | Baranowski et al. |
| 6,765,789 | B2 | 7/2004 | Yang |
| 6,768,911 | B2 | 7/2004 | Hino et al. |
| 7,149,552 | B2 | 12/2006 | Lair |
| 7,272,421 | B2 | 9/2007 | Bang et al. |
| 7,292,880 | B2 | 11/2007 | Lehtonen |
| 7,418,277 | B2 | 8/2008 | Tsai |
| D586,823 | S | 2/2009 | Anderson et al. |
| 7,548,040 | B2 | 6/2009 | Lee et al. |
| D600,013 | S | 9/2009 | McCune |
| 7,590,233 | B2 | 9/2009 | Chiloyan |
| 7,643,283 | B2 | 1/2010 | Jubelirer et al. |
| 7,738,247 | B2 | 6/2010 | Choi |
| 7,778,601 | B2 | 8/2010 | Seshadri et al. |
| 7,869,195 | B1 | 1/2011 | Patton |
| 7,885,645 | B2 | 2/2011 | Postma et al. |
| 8,116,832 | B2 | 2/2012 | Wang et al. |
| 8,121,329 | B2 | 2/2012 | Groset et al. |
| 8,204,435 | B2 | 6/2012 | Seshadri et al. |
| 8,213,666 | B2 | 7/2012 | Groesch |
| 8,238,967 | B1 | 8/2012 | Arnold et al. |
| D667,390 | S | 9/2012 | Matera |
| 8,384,527 | B2 | 2/2013 | Irwin |
| 8,582,755 | B2 | 11/2013 | Bradford et al. |
| 8,867,748 | B2 | 10/2014 | Posa |
| 9,002,420 | B2 | 4/2015 | Pattikonda et al. |
| D728,624 | S | 5/2015 | Akana et al. |
| 9,170,612 | B2 | 10/2015 | Farjami |
| 9,319,766 | B2 | 4/2016 | Weinstein et al. |
| 9,344,793 | B2 | 5/2016 | Selig et al. |
| 9,760,115 | B2 | 9/2017 | Farjami |
| 9,807,491 | B2 | 10/2017 | Kim |
| 2003/0119565 | A1 | 6/2003 | Lin |
| 2003/0224726 | A1 | 12/2003 | Shearer et al. |
| 2005/0008147 | A1 | 1/2005 | Lee |
| 2005/0026560 | A1 | 2/2005 | Villaverde et al. |
| 2005/0107120 | A1 | 5/2005 | Yueh |
| 2005/0186905 | A1 | 8/2005 | Tracy et al. |
| 2006/0046656 | A1 | 3/2006 | Yang |
| 2006/0062400 | A1 | 3/2006 | Chia-Chun |
| 2006/0111044 | A1 | 5/2006 | Keller |
| 2006/0135218 | A1 | 6/2006 | Son et al. |
| 2006/0166715 | A1 | 7/2006 | Engelen et al. |
| 2006/0262949 | A1 | 11/2006 | Cho et al. |
| 2007/0026908 | A1 | 2/2007 | Chen |
| 2007/0147629 | A1* | 6/2007 | Chiloyan ............. H04R 1/1033 381/74 |
| 2007/0254695 | A1 | 11/2007 | Langberg et al. |
| 2008/0070516 | A1 | 3/2008 | Lee et al. |
| 2008/0108306 | A1 | 5/2008 | Yee |
| 2009/0046869 | A1 | 2/2009 | Griffin, Jr. et al. |
| 2010/0245585 | A1 | 9/2010 | Fisher et al. |
| 2010/0312944 | A1 | 12/2010 | Walker |
| 2010/0320961 | A1 | 12/2010 | Castillo et al. |
| 2011/0141357 | A1 | 6/2011 | Price et al. |
| 2011/0148352 | A1 | 6/2011 | Wang et al. |
| 2011/0206217 | A1 | 8/2011 | Weis |
| 2011/0244927 | A1 | 10/2011 | Kari et al. |
| 2012/0140963 | A1 | 6/2012 | Larsen et al. |
| 2013/0065637 | A1* | 3/2013 | Tasker ................ H04M 1/6066 455/553.1 |
| 2013/0094687 | A1 | 4/2013 | Weinstein et al. |
| 2013/0206612 | A1 | 8/2013 | Chun |
| 2013/0244633 | A1 | 9/2013 | Jacobs et al. |
| 2013/0297844 | A1 | 11/2013 | Rosenberg et al. |
| 2014/0073256 | A1* | 3/2014 | Newham ............. H04M 1/6066 455/41.3 |
| 2014/0116085 | A1* | 5/2014 | Lam ..................... H04W 84/18 63/1.11 |
| 2014/0273851 | A1 | 9/2014 | Donaldson et al. |
| 2014/0279122 | A1* | 9/2014 | Luna .................. G06Q 30/0601 705/26.1 |
| 2014/0295758 | A1 | 10/2014 | Pedersen |
| 2015/0078557 | A1 | 3/2015 | Li |
| 2015/0078575 | A1 | 3/2015 | Selig et al. |
| 2015/0241922 | A1* | 8/2015 | Farjami ................ G06F 1/1635 361/679.03 |
| 2015/0245125 | A1 | 8/2015 | Shaffer |
| 2015/0245126 | A1 | 8/2015 | Shaffer |
| 2015/0326990 | A1 | 11/2015 | Yeh et al. |
| 2015/0373448 | A1 | 12/2015 | Shaffer |
| 2016/0004277 | A1 | 1/2016 | Farjami |
| 2016/0073189 | A1 | 3/2016 | Linden et al. |
| 2016/0360350 | A1 | 12/2016 | Watson et al. |
| 2017/0013342 | A1 | 1/2017 | Watson et al. |
| 2017/0272561 | A1* | 9/2017 | Kim ..................... H04M 1/6066 |

FOREIGN PATENT DOCUMENTS

| | | |
|---|---|---|
| CN | 201045758 Y | 4/2008 |
| CN | 201122956 Y | 9/2008 |
| CN | 201315619 Y | 9/2009 |
| CN | 203193717 U | 9/2013 |
| CN | 203720788 U | 7/2014 |
| CN | 204090096 U | 1/2015 |
| CN | 103815628 B | 11/2015 |
| JP | 2012100248 A | 5/2012 |
| WO | 2002/39600 A2 | 5/2002 |
| WO | 2003/098901 A1 | 11/2003 |
| WO | 2005/053289 A1 | 6/2005 |
| WO | 2005/064813 A1 | 7/2005 |
| WO | 2008/033491 A2 | 3/2008 |
| WO | 2010/083829 A1 | 7/2010 |

OTHER PUBLICATIONS

Website, http://mypinn.com/ in 5 pages, downloaded on Apr. 13, 2017.
Website, http://www.kickstarter.com/projects/906938906/pinn-all-in-one-earbud-mic-and-oled-display-for-sm?ref=discovery in 20 pages, published on Aug. 10, 2016 and was downloaded on Apr. 13, 2017.
Webiste, https://www.banggood.com/Seperate-Design-Bluetooth-Handsfree-Headset-Sports-Watch-For-iPhone-6-p-951983.html in 6 pages. Downloaded on Jun. 15, 2017.
International Search Report and Written Opinion dated Jul. 11, 2016 of PCT/US2016/025936 which is the parent application—10 pages.
Website, https://www.banggood.com/Separate-Design-Bluetooth-Handsfree-Headset-Sports-Watch-For-iPhone-6-p-951983.html in 12 pages. Downloaded on May 1, 2016.
Notification of Transmittal of International Preliminary Report on Patentability dated Jul. 17, 2017 in corresponding PCT application No. PCT/US2016/025936 in 28 pages.
Communication in cases for which no other form is applicable dated Aug. 15, 2017 in corresponding PCT application No. PCT/US2016/025936 in 12 pages.
"Jabra Mini User Manual"—18 pages (2013).
"Jabra Mini Bluetooth Headset", https://www.youtube.com/watch?v=BBxL9b70eFY (Dec. 20, 2013).
"Earin—The Worlds Smallest Wireless Earbuds", KICKSTARTER <https://www.kickstarter.com/projects/earin/earin-the-worlds-smallest-wireless-earbuds?ref=email—15 pages (accessed Oct. 5, 2018).
BRAGI LLC, "The Dash—Wireless Smart in Ear Headphones", KICKSTARTER <https://www.kickstarter.com/projects/hellobragi/the-dash-wireless-smart-in-ear-headphones—29 pages (accessed Oct. 5, 2018).

(56) References Cited

OTHER PUBLICATIONS

"Voyager Legend UC: Wireless Headset System (B235 and B235-M)", Plantronics—18 pages.
Plantronics charging case unboxing (https://www.youtube.com/watch?v=VrtVSjgquDM).
Bragi (company), <https://en.wikipedia.org/wiki/Bragi_(company), in 9 pages (accessed on Mar. 9, 2019).
Bragi, The Dash PRO Quick Start Guide—15 pages (2015).

* cited by examiner

PERSONAL MEDIA SYSTEM INCLUDING BASE STATION AND WIRELESS EARBUD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Today, wireless communication devices are very widely used. Mobile devices including smart phones, tablet computers, or the like are often used in conjunction with other wireless devices that can be paired with the mobile devices to provide better access to the inputs and outputs (e.g., display, speaker, microphone, etc.) of the mobile devices. For example, a user may want to keep his smart phone in his pocket while he is having a phone call or listening to music. In such a case, the user can establish a pairing between his smart phone and a wireless headset, so that the wireless headset can relay information to and from his smart phone, thereby eliminating the need to have an unobstructed access to the inputs and outputs provided on the smart phone.

SUMMARY

One aspect of the invention provides a personal media system comprising: a base station or main body comprising a connection hole, a user input button, at least one processor, at least one memory, and circuitry; and a wireless earbud capable of wireless pairing with a smartphone and configured for plugging into the connection hole of the base station to form an integrated body with the base station.

In the system, in response to pressing of the user input button, the at least one processor is configured to execute computer program instructions stored in the at least one memory to initiate processing for the wireless pairing with the smartphone. When the wireless pairing with the smartphone is made, the wireless earbud is configured to receive audio data from the smartphone and play audio using the audio data from the smartphone. In response to plugging the wireless earbud into the connection hole, the at least one processor is configured to execute computer program instructions stored in the at least one memory to initiate charging of a battery of the wireless earbud. When the wireless earbud is plugged into the connection hole of the base station, the wireless earbud is configured to electrically connect with the circuitry of the base station and further configured to performing wired data communication with the base station. The wireless earbud is not capable of wirelessly sending data to the base station.

The foregoing system may further comprise a mechanical clip integrated with the base station and configured for clipping a person's clothing. In the foregoing system, when the wireless earbud is plugged into the connection hole, the system may be configured such that the smartphone wirelessly communicates with at least one of the base station and the wireless earbud. The base station may further comprise a wireless communication module configured to wirelessly communicate with at least one of the smartphone and the wireless earbud. The at least one processor may be configured to determine whether the wireless earbud is plugged into the connection hole or unplugged out of the connection hole. The base station may further comprise a volume control button configured to control volume of the wireless earbud.

In the foregoing system, the base station may further comprise an information display. When the wireless pairing is made, the system may be configured to provide a battery status of the base station to the smartphone. The base station may further comprise a communication module configured to interface data communication with at least one of the smartphone and the wireless earbud. In response to unplugging the wireless earbud out of the connection hole, the system may be configured to initiate processing for the wireless pairing with the smartphone. In response to plugging the wireless earbud into the connection hole, the at least one processor may be configured to execute computer program instructions stored in the at least one memory to initiate ceasing of the wireless pairing with the smartphone.

Further in the foregoing system, the at least one processor may be configured to execute computer program instructions stored in the at least one memory to turn off the wireless pairing while the wireless earbud is being charged. In response to pressing the user input button, the at least one processor may be configured to execute computer program instructions stored in the at least one memory to initiate a Bluetooth pairing between the wireless earbud and the smartphone. The at least one processor may be configured to execute computer program instructions stored in the at least one memory to turn off the wireless pairing while the wireless earbud is being charged, wherein, in response to plugging the wireless earbud into the connection hole, the at least one processor is configured to execute computer program instructions stored in the at least one memory to initiate ceasing of the wireless pairing with the smartphone.

Further in the foregoing system, the base station may further comprise a communication module configured to interface data communication with at least one of the smartphone and the wireless earbud, wherein the at least one processor is configured to determine whether the wireless earbud is plugged into the connection hole or unplugged out of the connection hole. The at least one processor may be configured to determine whether the wireless earbud is plugged into the connection hole or unplugged out of the connection, wherein, when the wireless earbud is plugged into the connection hole, the smartphone is configured to wirelessly communicate with at least one of the base station and the wireless earbud. The base station may further comprise a communication module configured to interface data communication with at least one of the smartphone and the wireless earbud, wherein in response to pressing the user input button, the at least one processor is configured to execute computer program instructions stored in the at least one memory to initiate a Bluetooth pairing between the wireless earbud and the smartphone.

Still further in the foregoing system, the base station may further comprise a communication module configured to interface data communication with at least one of the smartphone and the wireless earbud, wherein, when the wireless earbud is plugged into the connection hole, the system is configured such that the smartphone wirelessly communicates with at least one of the base station and the wireless earbud. The at least one processor may be configured to determine whether the wireless earbud is plugged into the connection hole or unplugged out of the connection hole, wherein the base station further comprises a communication module configured to interface data communication with at least one of the smartphone and the wireless earbud, wherein, when the wireless earbud is plugged into the connection hole, the system is configured such that the smartphone wirelessly communicates with at least one of the base station and the wireless earbud. The at least one processor may be configured to determine whether the wireless earbud is plugged into the connection hole or unplugged out of the connection hole, wherein, in response to unplugging the wireless earbud out of the connection hole, the system is configured to initiate processing for the wireless pairing with the smartphone.

The apparatus may be further programmed to cause audio data to be sent to the wireless earbud and to play sound through the wireless earbud while the wireless earbud is unplugged from the connection hole. Wherein, when the wireless earbud is paired with the smartphone, the system is configured: to provide a battery status to the smartphone for displaying on a mobile application of the smartphone; and to let the mobile application control at least one function of the apparatus.

Another aspect of the invention provides a method of operating the foregoing system. The method comprises: initiating to process the wireless pairing with the smartphone in response to pressing of the user input button provided on the main body; and turning off the wireless pairing with the smartphone while the wireless earbud is charged from the main body.

In some aspects, a personal wireless media station is in communication with a paired mobile computing device of a user for playing sound and displaying information based on communication with the paired mobile computing device. The personal wireless media station includes a main body, a wireless earbud, a first wireless module, and a second wireless module. The main body includes an information display, a speaker, the fire and second wireless modules, and a main body connector. The wireless earbud includes an earbud connector that is mateable with the main body connector. The wireless earbud and the main body form a single integrated body when the earbud connector and the main body connector are connected with each other. The first wireless module wirelessly communicates with a mobile computing device that has been paired with the personal wireless media station. The second wireless module wirelessly communicates with the wireless earbud.

In some aspects, the personal wireless media station plays sound through the speaker or causes the wireless earbud to play sound when the personal wireless media station receives audio data from the paired mobile computing device via the first wireless module. The personal wireless media station is programmed to detect when the earbud connector connects to the main body connector, play sound through the speaker of the main body while the earbud connector is connected to the main body connector, detect when the earbud connector disconnects from the main body connector, stop playing sound through the speaker when it is detected that the earbud connector is disconnected from the main body connector, and wirelessly send audio data to the earbud and cause to play sound through the earbud while the earbud connector is not connected to the main body connector.

In some aspects, the personal wireless media station is further programmed to stop wireless sending of audio data to the earbud when it is detected that the earbud connector has got connected to the main body connector, and start wireless sending of audio data to the earbud when it is detected that the earbud connector has got disconnected from the main body connector.

In some aspects, the first wireless module performs two-way wireless data communication with the paired mobile computing device, the second wireless module performs one-way wireless data communication to send data to the wireless earbud, and the wireless earbud is not capable of wirelessly sending data to the personal wireless media station.

In some aspects, the wireless earbud is not capable of wirelessly sending data to the personal wireless media station, and the wireless earbud is capable of performing two-way wired data communication with the personal wireless media station when the earbud connector is connected to the main body connector.

In some aspects, the personal wireless media station plays sound only as it receives from the paired mobile computing device audio data for the sound to play.

In some aspects, the personal wireless media station does not include a digital storage device for storing a library of audio contents that are not being played through either the speaker or the earbud.

In some aspects, the personal wireless media station further includes a mechanical clip attached to the main body for clipping the wireless media station to a person's clothing or accessory.

In some aspects, both the earbud connector and the main body connector are audio connectors, wherein one of the audio connectors is a female audio connector and the other is a male audio connector.

In some aspects, the personal wireless media station further includes a camera module integrated with the main body.

In some aspects, the personal wireless media station further includes a microphone integrated with the main body, wherein the personal wireless media station plays sound of telephonic conversation from the paired mobile computing device. When the earbud connector is connected to the main body connector, the sound of telephonic conversation plays through the earbud while the user's voice is inputted through the microphone of the main body.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which.

DETAILED DESCRIPTION OF EMBODIMENTS

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

Perspective View of Personal Wireless Media Station

Figure 1:
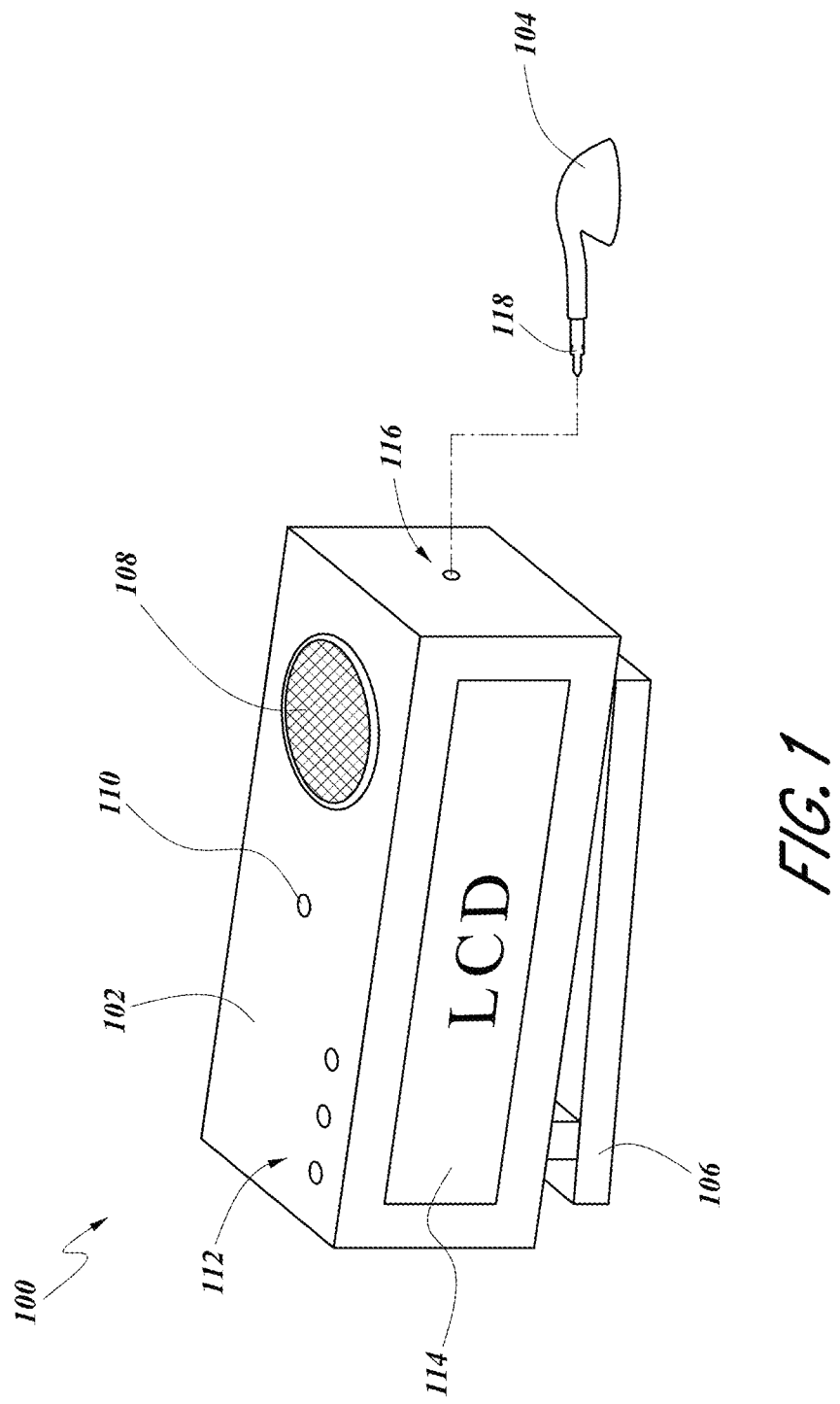
FIG. 1 illustrates a perspective view of a personal wireless media station in accordance with an embodiment.

FIG. 1 illustrates a perspective view of the personal wireless media station 100 in accordance with an example embodiment. The personal wireless media station 100 includes a main body 102 and a wireless earbud 104.

Main Body

The main body 102 includes a clip 106, a speaker 108, a light-emitting diode (LED) light indicator 110, a microphone 112, a liquid crystal display (LCD) screen 114, and a main body connector 116. The clip 106 clips the personal wireless media station 100 to the user's clothing (e.g., shirt, tie, pocket, etc.). Instead of the clip 106, the main body 102 may include any other attachment mechanism such as a band or other fasteners for attaching the main body 102 to the user's body. The speaker 108 plays back sound from another user device (not shown) paired with the personal wireless media station 100. The LED light indicator 110 indicates information to the user by blinking or flashing light therefrom. The microphone 112 captures sound information and provides the captured sound information to the user device paired with the personal wireless media station 100. The LCD screen displays information to the user. The displayed information may include, but is not limited to, call information, song information, text message information, email information, and the like.

Wireless Earbud

The wireless earbud 104 includes an earbud connector 118. As illustrated in FIG. 1, the earbud connector 118 of the wireless earbud 104 is mateable with the main body connector 116 of the main body 102. The wireless earbud 104 plays back sound information received from the main body 102 of the personal wireless media station 100. In some embodiments, the wireless earbud 104 plays back sound received from the main body 102 when the earbud connector 118 is not connected to the main body connector 116. When the earbud connector 118 is connected to the main body connector 116, the wireless earbud 104 and the main body 102 for a single integrated body.

Other Components of Main Body

Although not shown in FIG. 1, the personal wireless media station 100 may include one or more buttons or sensors for receiving the user's input. Such buttons or sensors may include a power button, volume control button(s), touch sensitive button(s), function button(s), or the like. The personal wireless media station 100 may include a charging slot (not shown) into which a charging cable (not shown) for charging the personal wireless media station 100 may be inserted. The personal wireless media station 100 may also include one or more other components (e.g., a camera) that are not illustrated in FIG. 1. Further, the personal wireless media station 100 may include one or more additional wireless earbuds 104, clips 106, speakers 108, LED indicators 110, microphones 112, LCD screens 114, and/or main body connectors 116. In some embodiments, one or more of the components shown in FIG. 1 may be omitted.

Example Use of Personal Wireless Media Station

Figure 2:
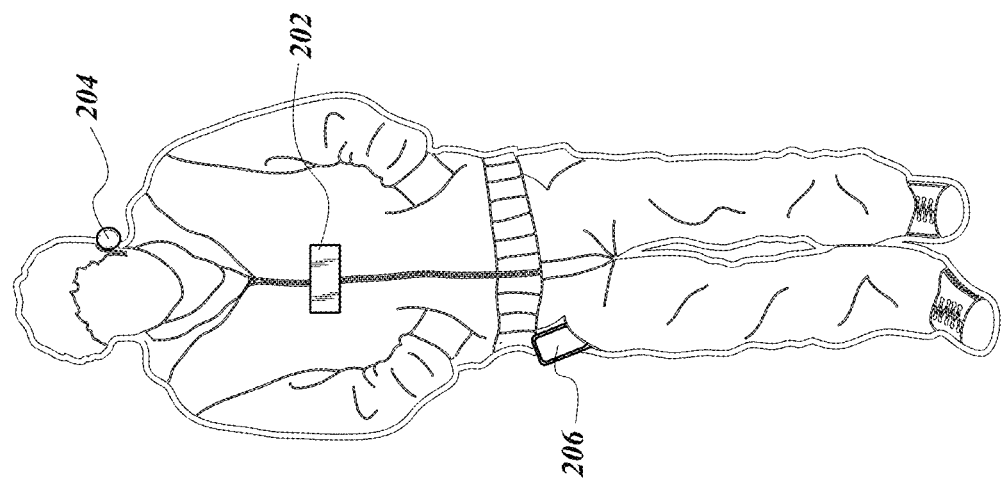
FIG. 2 illustrates an example use of a personal wireless media station in accordance with an embodiment.
Figure 2:
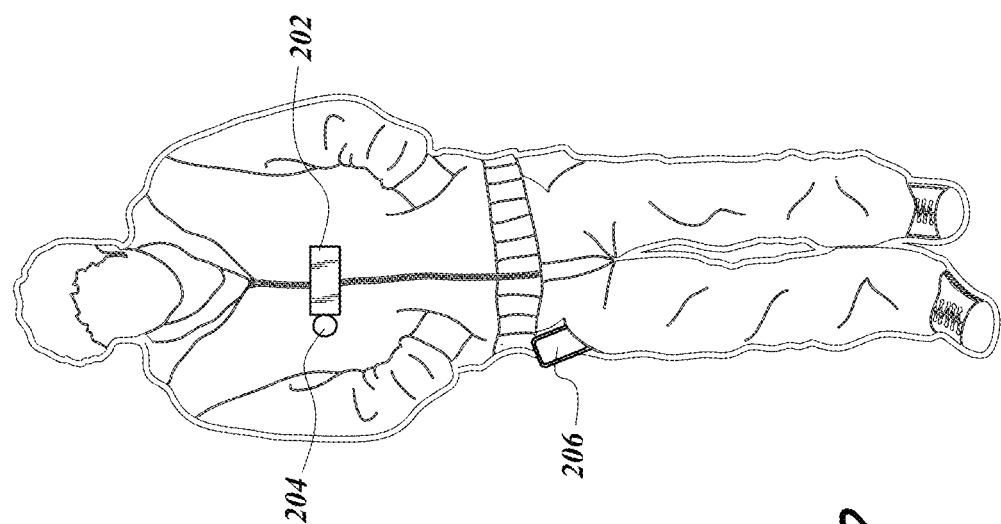

FIG. 2 illustrates an example use of a personal wireless media station 200. As illustrated in FIG. 2, the personal wireless media station 200 includes a main body 202 and a wireless earbud 204. The personal wireless media station 200 is further paired with a user device 206. In mode 1, the wireless earbud 204 is connected to the main body 202. When the wireless earbud 204 is connected to the main body 202, the sound information transmitted from the user device 206 to the personal wireless media station 200 is played back through the speaker of the main body 202. In mode 2, the wireless earbud 204 has been detached from the main body 202, and the user has the wireless earbud 204 plugged into his ear. When the wireless earbud 204 is not connected to the main body 202, the sound information transmitted from the user device 206 to the personal wireless media station 200 is played back through the wireless earbud 204. In mode 2, all other components of the main body 202 (e.g., other than the speaker) may still be active and may output and/or collect information to and from the user.

Detecting Connection and Disconnection

The main body connector 116 may include a switch that is used for plug detection (e.g., such a switch may be switched on upon insertion of a connector). Alternatively or additionally, the main body connector 116 may include circuitry that measures the impedance and/or other characteristics of the connector (e.g., the earbud connector 118) that plugs into the main body connector 116. The main body connector 116 may provide any measured information to the processor included in the personal wireless media station 100.

Connectors

In some embodiments, the main body connector 116 is a female 3.5 mm earphone socket, and the earbud connector 118 is a male 3.5 mm earphone plug. The main body connector 116 is configured to receive the earbud connector 118.

Playing Sound Between Main Body and Wireless Earbud

Upon insertion of the earbud connector 118 into the main body connector 116, the sound information received from the user device (not shown) stops to be played back via the speaker 108 and begins to be played back via the wireless earbud 104. The techniques for redirecting the playback of the sound information are described in greater detail below with reference to FIG. 4.

Example Flowchart for Redirecting Sound Playback

Figure 3:
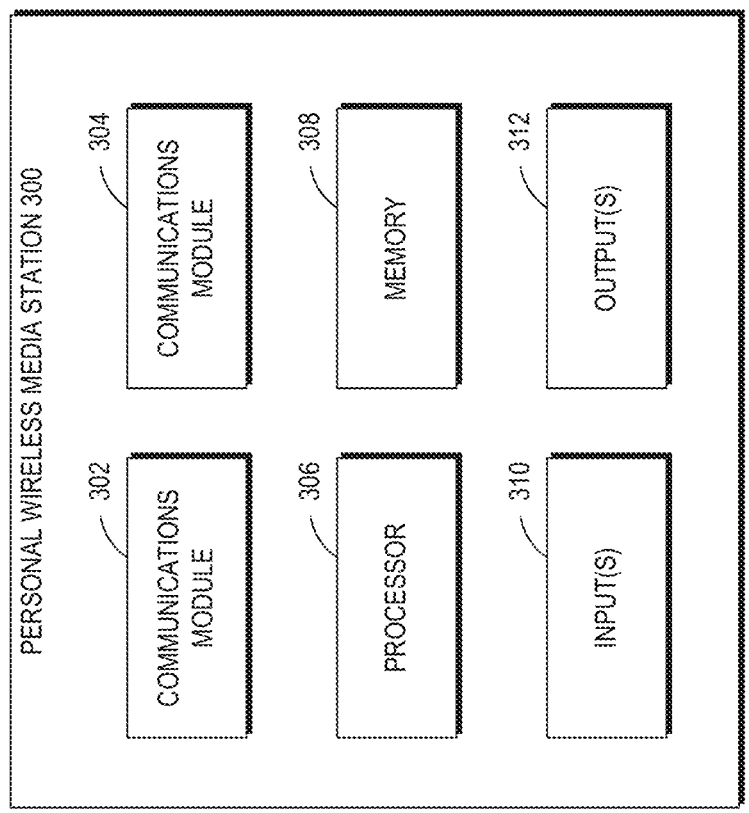
FIG. 3 illustrates a block diagram of a personal wireless media station in accordance with an embodiment.
Figure 4:
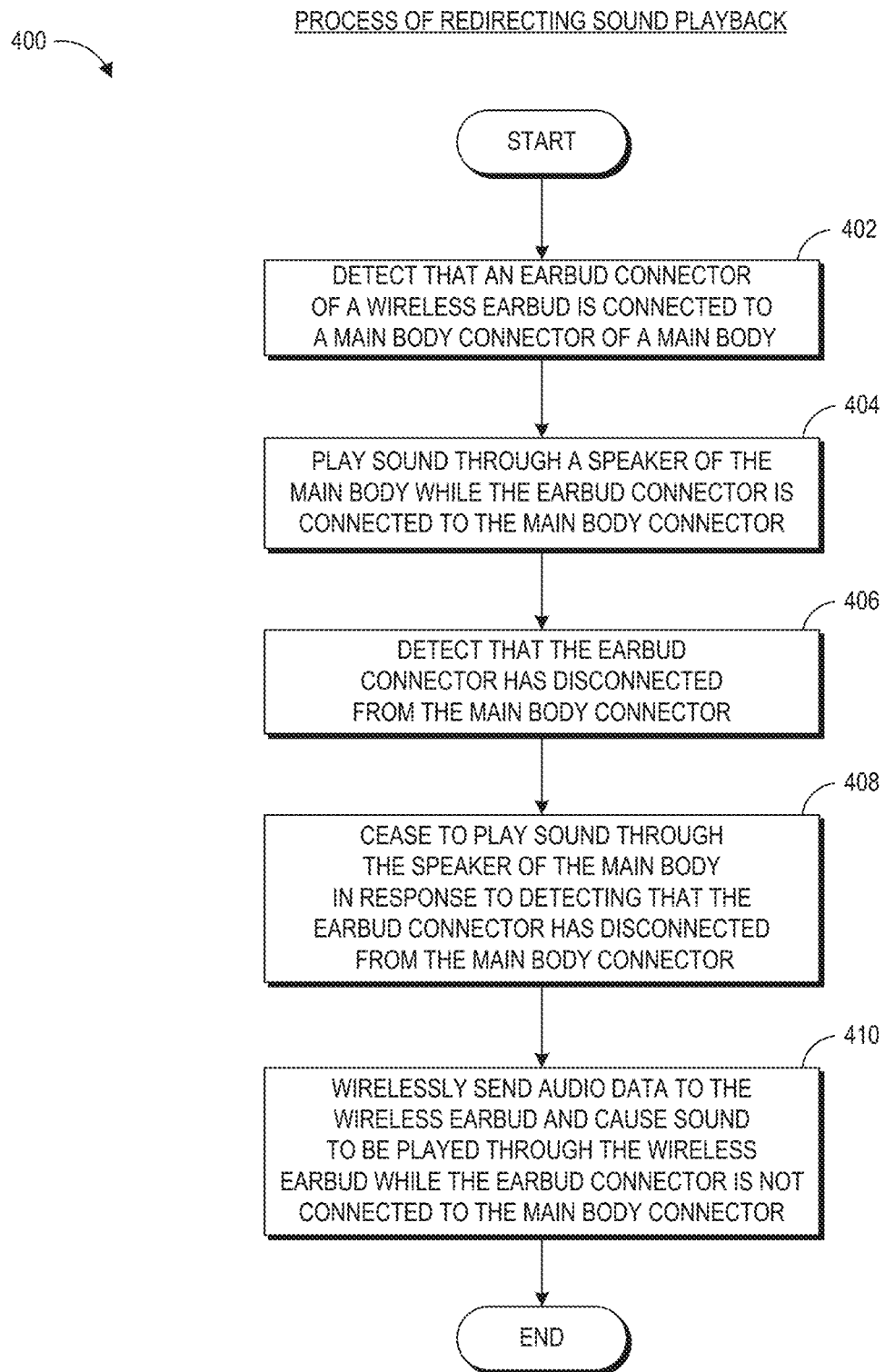
FIG. 4 illustrates a flowchart depicting an example method of redirecting sound playback in accordance with an embodiment.

FIG. 4 is a flowchart illustrating a method 400 for redirecting sound playback, according to an embodiment of the present disclosure. The steps illustrated in FIG. 4 may be performed by the personal wireless media station 200 of FIG. 3, or any components therein, or any other personal wireless media stations discussed herein or other devices (presently known or developed in the future) within the scope of the present disclosure. For convenience, method 400 is described as performed by the personal wireless media station 200.

The method 400 begins at block 401. At block 402, the personal wireless media station 200 detects that the earbud connector of the wireless earbud 204 is connected to the main body connector of the main body 202.

At block 404, the personal wireless media station 200 plays sound through the speaker of the main body 202 while the earbud connector is connected to the main body connector.

At block 406, the personal wireless media station 200 detects that the earbud connector has disconnected from the main body connector.

At 408, the personal wireless media station 200 ceases to play sound through the speaker of the main body 202 in response to detecting that the earbud connector has disconnected from the main body connector.

At block 410, the personal wireless media station 200 wirelessly sends audio data to the wireless earbud 204 and causes sound to be played through the wireless earbud 204 while the earbud connector is not connected to the main body connector.

As discussed above, there may be situations when the user may want to have a call or listen to the music privately using the wireless earbud 204. In such situations, the user can simply unplug the wireless earbud 204 from the main body 202 of the personal wireless media station 200, and the sound information received from the user device 206 automatically begins to be played back via the wireless earbud 204 without the user having to activate the wireless earbud 204 or press any button(s).

Incoming Text and Email Messages

The personal wireless media station 100 may allow the user to read text messages and emails via the LCD screen 114, without having to maneuver the user device 206. In some embodiments, when a new text message or email arrives, information regarding the text message or email is transmitted to the personal wireless media station 100 by the user device 206. Based on the information received from the user device 206, the personal wireless media station 100 may cause at least a portion of the content of the text message or email on the LCD screen 114. For example, the LCD screen 114 may initially display a notification that a new text message or email has arrived, and upon detecting a user input indicating that the user wishes to view the content of the text message or email, display the beginning portion of the text message or email.

Scrolling

Once the beginning portion of the text message or email is displayed on the LCD screen 114, the personal wireless media station 100 may continue to display the remaining portion of the text message or email by scrolling the content across the LCD screen 114 (e.g., move the text displayed on the LCD screen 114 to the left at a specified speed, with the displayed text disappearing to the left end of the LCD screen 114 and new text appearing from the right end of the LCD screen 114).

Jumping to Next Message or Email

The personal wireless media station 100 may cause the next text message or email to be displayed if additional unopened text messages or emails exist. For example, while a text message or email is being displayed on the LCD screen 114, if the user provides a user input indicating that the user wishes to view the next text message or email, the personal wireless media station 100 causes the beginning portion of the next text message or email to be displayed on the LCD screen 114.

Display Scrolling Speed

The user may control the speed at which the text is scrolled across the LCD screen 114, for example, by using the volume up and volume down buttons. Other buttons may be used to control the scrolling speed. For example, if the user slides his finger across the touch-sensitive button in one direction, the personal wireless media station 100 increases the scrolling speed, and if the user slides his finger across the touch-sensitive button in the other direction, the personal wireless media station 100 decreases the scrolling speed.

Page Turning

In some embodiments, the personal wireless media station 100, after causing the beginning portion of the text message or email on the LCD screen 114, awaits a user input indicating that the user wishes to view the next portion of the text message or email. When the user provides such an input (e.g., by activating a button on the personal wireless media station 100), the personal wireless media station 100 causes the next portion of the text message or email to be displayed on the LCD screen 114.

Display Text Size

The user may control the size of the text displayed on the LCD screen 114, for example, by using the volume up and volume down buttons. Other buttons or combinations of buttons may be used to control the text size (e.g., function button+volume up increases the text size and function bottom+volume down decreases the text size).

Incoming Telephone Call

In some embodiments, when a call is received on the user device 206, the information regarding the call (e.g., information indicating who the caller is) is transmitted to the personal wireless media station 100, and based on the received information, the personal wireless media station 100 causes caller information to be displayed on the LCD screen 114. Additionally, the personal wireless media station 100 may provide an indication that a call is incoming via the speaker 108 by playing a sound, via the LED indicator 110 by providing a blinking signal, or by vibrating the main body 102.

Taking an Incoming Telephone Call

While a call is incoming, the user may provide a user input to the personal wireless media station 100 to take the call. For example, the user may press the function button to indicate that he wishes to take the call, and in response, the personal wireless media station 100 may transmit the indication to the mobile device 206 and cause the mobile device 206 to take the call. During the call, the sound information is transmitted from the mobile device 206 to the personal wireless media station 100 and the voice information captured by the microphone 112 is transmitted from the personal wireless media station 100 to the mobile device 206. If the wireless earbud 104 is not connected to the main body 102, the personal wireless media station 100 may further relay the sound information to the wireless earbud 104 to be played via the wireless earbud 104.

Black Box Feature

The personal wireless media station 100 may include a black box feature. For example, the personal wireless media station 100 may capture audio data or image data upon user activation of the black box feature. In some embodiments, the personal wireless media station 100 records audio data captured by the microphone 112 in the background and/or records image or video data captured by a camera module (not shown) in the background. The recorded data may be transmitted to the user device 206, and may be discarded after a specified period of time or after a specified amount of new data has been collected.

Charging

The personal wireless media station 100 may charge the wireless earbud 104 while the wireless earbud 104 is plugged into the main body 102. The main body 102 may be charged via a charge port (not shown in FIG. 1) using an external charging cable. When the wireless earbud 104 is plugged into the main body 102 for charging, the wireless communication between the main body 102 of the personal wireless media station 100 and the wireless earbud 104 may be turned off.

No Storage

The personal wireless media station 100 may not have any storage (e.g., nonvolatile memory), and any data output by the personal wireless media station 100 may be stored on volatile memory. For example, the personal wireless media station 100 may only stream sound without permanently storing any audio data on the personal wireless media station 100. The audio data transmitted from the user device 206 to the main body 202 may further be transmitted and played via the wireless earbud 104.

Mechanical Clip or Necklace

As shown in FIG. 1, the personal wireless media station 100 includes a clip 106 that may be used to attach the personal wireless media station 100 to the user's clothing (e.g., shirt) or accessory (e.g., hat). The clip 106 may be integrated with the body and may include a spring plate that faces the rear surface of the body of the personal wireless media station 100. In some embodiments, instead of or in addition to the clip 106, the personal wireless media station 100 includes a necklace that may be used to hang the personal wireless media station 100 from the user's neck.

Watch

The personal wireless media station 100 may include a watch feature. For example, the LCD screen 114 may display the current time when the LCD screen 114 is idle, when the LCD screen 114 is not displaying information received from the user device 206, or when the user presses one of the buttons of the personal wireless media station 100. The personal wireless media station 100 may further include an alarm function that plays an alarm indication at a specified time via the speaker 108, the LED indicator 110, and/or the LCD screen 114. In some embodiments, the user device 106 may transmit such an alarm indication to the personal wireless media station 100 at the specified time. In response to receiving the alarm indication, the personal wireless media station 100 causes the alarm indication to be output to the user via the speaker 108, the LED indicator 110, and/or the LCD screen 114.

Camera

The personal wireless media station 100 may include a camera feature. The personal wireless media station 100 may capture images via a camera module, and the personal wireless media station 100 may transmit the captured images to the user device 206 and cause the captured images to be stored in the user device 206.

Mobile Phone Application

The user device 206 may have a mobile application installed thereon for configuring the personal wireless media station 100. For example, the mobile application may be configured to set and monitor the Bluetooth pairing with the personal wireless media station. The mobile application may include a feature for finding a personal wireless media station within the communication range. The mobile application may be used to monitor and control the various features of the personal wireless media station 100. The mobile application may be configured to display (or cause the personal wireless media station 100 to display) a low battery warning based on the battery status of the personal wireless media station 100. The mobile phone may be configured to automatically transmit any audiovisual information that may otherwise be displayed on the mobile phone itself to the personal wireless media station 100 when the mobile device 206 is paired with the personal wireless media station 100. The mobile application may also receive audio data and image data captured by the personal wireless media station 100 and store the data in a memory of the mobile device 206.

Example Configuration of Personal Wireless Media Station

FIG. 3 illustrates a block diagram of a personal wireless media station 300, according to an example embodiment. As shown in FIG. 3, the personal wireless media station 300 includes communications modules 302 and 304, a processor 306, a memory 308, input(s) 310, and output(s) 312. The processor 306 may include one or more processors. The input(s) 310 may include one or more microphones, mechanical buttons, touch-sensitive buttons, switches, etc. The memory 308 may be a volatile memory, a non-volatile memory, or a combination thereof. The output(s) 312 may include one or more speakers, LCD screens, LED indicators, etc.

Communication Between Components

Although communication between the components is not illustrated in FIG. 3, each component may communication with one or more other components. For example, the communications modules 302 and 304 may communicate with the user device 206 and the wireless earbud 204 of FIG. 2, respectively. The processor 306 may communicate with each of the other components illustrated in FIG. 3.

Two-Way Wireless Module

In some embodiments, the communications module 302 is a two-way wireless module. In such embodiments, the communications module 302 receives information from the user device 206 as well as transmits information to the user device 206. The communications module 302 may use Bluetooth technology. However, the communications module 302 is not limited as such and may be implemented using any wireless communications standards currently available or developed in the future. For example, the information received from the user device 206 may include call information, caller information, sound information, text, voice, or video message information, and any other information that the user can directly (e.g., without the help of the personal wireless media station 100) access from the user device 206. The information transmitted to the user device 206 may include user input information, recorded sound information, captured image information, and any other information that the user can directly (e.g., without the help of the personal wireless media station 100) provide to the user device 206.

One-Way Wireless Module

In some embodiments, the communications module 304 is a one-way wireless module. In such embodiment, the communications module 304 transmits information to the wireless earbud 104 but does not receive any information from the wireless earbud 104. The communications module 304 may use Bluetooth technology. However, the communications module 304 is not limited as such and may be implemented using any wireless communications standards currently available or developed in the future. For example, the information transmitted to the wireless earbud 104 may include sound information or any other information that the user can directly (e.g., without the help of the wireless earbud 104) access from the main body 102 of the personal wireless media station 100. In some embodiments, the communications module 304 is a two-way wireless module. In other embodiments, the personal wireless media station 300 does not have the communications module 304, and instead, the communications module 302 is used to communicate with both the user device 206 and the wireless earbud 204.

Processor

The processor 306 may receive information and instructions from other computing systems via the communications module 302. Further, the processor 206 may store information in the memory 308 or retrieve information from the memory 308. The processor 306 may process input information received by the input(s) 310, and provide output information to the output(s) 312. Further, the processor 306 may perform one or more techniques described herein regarding the process of redirecting sound playback. For example, the processor 306 may, via one or more sensors or detectors, detect whether the earbud connector of the wireless earbud 204 is connected to the main body connector of the main body 202. Based on whether the earbud connector of the wireless earbud 204 is connected to the main body connector of the main body 202, the processor 306 may cause different output(s) to play back the sound based on the audio data received from the user device 206.

Memory

The memory 308 may store audio data transmitted from the user device 206. In some embodiments, the memory 308 is a volatile memory and only stores what is currently being transmitted and played back by the personal wireless media station 300. For example, all the data stored in the memory 308 may be lost shortly after use or upon power down of the personal wireless media station 300. In other embodiments, the memory 308 is a nonvolatile memory or a combination of volatile and nonvolatile memory. The memory 308 may include RAM, ROM and/or other persistent, auxiliary or non-transitory computer-readable media. The memory 308 may store computer program instructions to be unexecuted by the processor 306 in the general administration and operation of the personal wireless media station 300. The memory 308 may further include computer program instructions and other information for implementing aspects of the present disclosure.

Input(s)

The personal wireless media station 300 may include one or more inputs (e.g., physical or digital buttons) that allow the user of the personal wireless media station 300 to enter various user commands. In some embodiments, the personal wireless media station 300 includes a function button. The function button may be used to power on or off the personal wireless media station 300 (e.g., by the user pressing and holding the function button for a prolonged amount of time). Further, the function button may be used to answer or end calls, or open or close incoming text messages or emails. In one embodiment, if the user presses the function button twice in a specified period of time, the processor 306 initiates a Bluetooth pairing between the personal wireless media station 300 and the user device 206. The personal wireless media station 300 may include one or more volume control buttons. In some embodiments, the volume control buttons may be used to control the text scroll speed, turn pages of text messages or emails, enable or disable the black box feature described herein (e.g., the volume control buttons may be used to start and end recording audio data or image data).

Output(s)

The output(s) may include one or more speakers, displays, LED indicators, and the like. The speaker may be configured to play sound received from the user device 206. The sound played via the speaker may be a telephone conversation, a song, a voice recording, an alarm, etc. The display may include one or more display screens that display, e.g., under the control of the processor 306, the information processed by the processor 306. The information may include text, images, or other visual content. For example, the display may be provided on a side surface of the personal wireless media station 100 as shown in FIG. 1. The one or more display screens can be any of various conventional displays such as a liquid crystal display (LCD), a light-emitting diode (LED) display, etc., or any other display means to be developed in the future. In certain embodiments, the display is a color display. In other embodiments, the display is not a color display but is grayscale.

Other Components of Personal Wireless Media Station

The personal wireless media station 300 is not limited to the configuration illustrated in FIG. 3, and may include one or more other components. For example, the personal wireless media station 300 may include a camera module configured to capture image data. Such a camera module may communicate with the processor 306 to cause the captured image data to the user device 206 (e.g., via the communications module 302).

Activating and Deactivating Voice Command Feature

The personal wireless media station 300 may be configured to activate or deactivate the voice command feature of the user device 206 based on a user input to the personal wireless media station 300. For example, the user may press a button provided on the personal wireless media station 300, and the button may be configured to generate a command to the user device 206 wirelessly connected to the personal wireless media station 300 to turn on or turn off the voice command feature of the user device 206. Other user inputs to the personal wireless media station 300 may be configured to activate or deactivate other features of the user device 206.

Two-Way Communication with Wireless Earbud

The wireless earbud 204 may be paired with the main body 202 of the personal wireless media station 300 using a two-way wired or wireless communication.

Recording Telephone Calls

In some embodiments, the personal wireless media station 300 may be configured to recorded telephone calls. The recording may be initiated on the personal wireless media station 300 or the mobile application running on the user device 206. The recording may be stored in cloud storage assigned to the registered user of the user device 206 or the personal wireless media station 300. For example, the user may register his or her personal wireless media station 300 online (e.g., on the provider associated with the personal wireless media station 300 or any other provider of cloud storage services), and cloud storage may be provided to the user for use. The recording may have a file name including the name or the telephone number of the calling party initiating the telephone call.

Additional Features

Hands free phone call and text display—Pinn device control:
  +/− key: Earbud volume and text scrolling speed adjustment
  Function key
    Siri activation (Press and hold the function key for 3 sec.)
    Text display on/off (Single press)—On when there is unread text/Off after read
    Phone call receive/end (Sing press)—Receive when ringing
Power on/off—Desirably, sleep/wake→Off all functions but the Pinn Finder™ is able to find the Pinn (Minimizing battery life is KEY)
Pinn Finder™ (via using Pinn App)—Pinn beeps and blinks when the mobile App is searching Pinn
Sound recording (via using Pinn App)
  Sound recording using Pinn microphone when not calling
  Phone conversation recording when calling (Only available using the App)
LCD display indicates current data/time and battery life status—Display on when single press the function key (When there is no unread text either while no phone call/incoming phone ringing)
  Low battery alert (Optional)—LED light indicator blinks in red
Automatic Bluetooth on/off—Off when charging
Automatic speaker/earbud mode change:
  Speaker mode (Earbud off)—When earbud connected to the base station (Earbud charging)
  Earbud mode (Speaker off)—When earbud disconnected from the base station
Silent mode on/off—LED light indicator only/both LED and speaker Additional Features
Siri activation—Press and hold the function key
Earbud volume control—By pressing +/− key while phone call (Volume level 1-7)
Text scroll speed control—By pressing +/− key while displaying text
Speaker output volume control—By pressing +/− key while phone call when earbud connected
Silent mode on/off—Press and hold (−) key for silent mode/press and hold (+) key for normal
Next & previous message display—Double press +/− button
Call waiting—Press and hold function key
  Additional Features
Voice recording start/stop and playback control
Hands free mode on/off (mobile phone default App)
Pinn finder
Device setting
  Factory default setting
  Earbud volume
  Microphone input volume control
  Text scrolling speed and type (page turning type or scrolling)
  Text inversion (upside down)
  LCD brightness control
  Siri activation on/off
    When on—Press and hold the function button for 3 sec. to activate Siri
    When off—Press and hold the function button for 3 sec. to call back to the most recent call
  Automatic Bluetooth on/off (Optional)—Automatically off when charging. But could be default function and not able to turn off this function.
Battery charge for both base station and earbud when mini USB cable connected to the base station
New earbud pairing in case of earbud lost (Earbud can be sold separately)—By using App (i.e., input earbud serial #for pairing)
Bluetooth priority to the Pinn device (Optional)
Water resistant—IPX 4
  Additional Features: Pinn Models
Design—Unique, sleek, fashionable, fancy & compact (Tie clip look)
2 or 3 color options—Platinum, Titanium and/or Gold
  Additional Features: Accessories
Earbud
Charging cable or charging station
Car charger
Necklace strings
  Additional Features
Camera integration
  By App setting—Take a photo every 1 minute when on and when not charging
New casing (design)
  Smaller & Thinner
  Necklace type
    Various color/material necklace string can be sold—i.e. black, pink, gold & etc.
    Easy string replacement but special connecting mechanism required only for Pinn certified strings—This can be applicable for the 1$^{st}$ generation tie pin type Pinn product (TBD)
  Belt clip type
    Belt clip holster with Pinn headset
  Additional Features: Mobile App
Pinn device setting
Pinn software control
Battery life indication and low battery alert
Sound recording and storage (storage page is separated like music library)
Siri linking capability
Pinn device finder—Beeps and LED blinks when search
  Additional Features: Mobile App
Device setting
  Default setting—TBD
  Earbud volume
  Text scrolling speed
  Text auto display on/off
  LCD brightness
  Microphone input volume
  Speaker output volume
  Siri function on/off
  LED light indicator on/off
  Automatic Bluetooth on/off (Optional)—Automatically off when charging
Function control (including while using the Pinn device)
  Earbud volume control (i.e. 1-10)
  Text scroll speed control
  LCD brightness control
  Microphone input volume control
  Speaker output volume control
  Voice recording start and stop button while phone call—
    Automatic file name generation
    Date, time and caller ID
    Display recorded duration
    Storage page
      Display like music library
      Select file then show playback control and detail information such as date, time, caller ID and etc.
  Hands free mode on/off (mobile phone default and in the app as well)
  Attritional Features: Mobile App Buttons
Device setting page
Device function control
Device finder
And record library
  Additional Features: Mobile App Buttons
Pinn device user can download "Standard App" for free that has all capability listed above.
Pinn user also can select "Monthly Subscription Base App" Store recorded data in the "Pinn Cloud" server for users Monthly fee base
  i.e. $1.99/mo for 2 GB
  Auto naming for the recorded data—Name includes caller ID
  Also provide photo storage for the 2$^{nd}$ generation Pinn product that includes camera
Other Considerations
Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, and that various changes in form and details may be made without departing from the spirit and scope of the present disclosure as set forth in the following claims.

What is claimed is:

1. A mobile system comprising:
a mobile base station comprising a connection hole, a user input button, at least one processor, at least one memory, and circuitry; and
a wireless earbud configured for plugging into the connection hole of the mobile base station to form an integrated body with the mobile base station,
wherein, while the wireless earbud is plugged in the connection hole of the mobile base station, the wireless earbud is configured to electrically connect with the circuitry of the mobile base station and further configured to perform wired data communication with the mobile base station,
wherein, while the wireless earbud is plugged in the connection hole of the mobile base station, the circuitry of the mobile base station is configured to obtain characteristics of the wireless earbud and send the characteristics to the at least one processor,
wherein, while the wireless earbud is plugged in the connection hole of the mobile base station, the at least one processor is configured to execute computer program instructions stored in the at least one memory to initiate charging of a battery of the wireless earbud,
wherein the wireless earbud has wireless communication capability for wireless pairing with a smartphone to perform data communication with the smartphone,
wherein the mobile system is configured to generate sound when a mobile application installed on the smartphone is searching for the mobile system while the wireless earbud is paired with the smartphone,
wherein, in response to pressing of the user input button of the mobile base station, the at least one processor is configured to execute computer program instructions stored in the at least one memory to initiate processing for the wireless pairing,
wherein the wireless earbud is not capable of wirelessly sending data to the mobile base station.

2. The system of claim 1, further comprising a mechanical clip integrated with the mobile base station and configured for clipping a person's clothing, wherein the wireless earbud is not capable of wirelessly sending data to the mobile base station.

3. The system of claim 1, wherein, when the wireless earbud is plugged into the connection hole, the system is configured such that the smartphone wirelessly communicates with at least one of the mobile base station and the wireless earbud.

4. The system of claim 1, wherein the mobile base station further comprises a wireless communication module configured to wirelessly communicate with at least one of the smartphone and the wireless earbud.

5. The system of claim 1, wherein the at least one processor is configured to determine whether the wireless earbud is plugged into the connection hole or unplugged out of the connection hole of the mobile base station, wherein the mobile base station is configured such that battery charging of the wireless earbud is performed while the wireless earbud is plugged in the connection hole of the mobile base station.

6. The system of claim 1, wherein the mobile base station further comprises a volume control button configured to control volume of the wireless earbud, wherein the wireless earbud is not capable of wirelessly sending data to the mobile base station.

7. The system of claim 1, wherein the system is configured such that, in response to plugging into the connection hole of the mobile base station, the wireless earbud initiates wired data communication with the mobile base station, wherein the wireless earbud is further configured to initiate the wireless pairing in response to unplugging out of the connection hole of the mobile base station, wherein the system is configured such that, subsequent to unplugging out of the connection hole of the mobile base station, the wireless earbud generates sound using audio data from the smartphone without an additional action of a user to the wireless earbud.

8. The system of claim 1, wherein the system is configured to such that, in response to plugging into the connection hole of the mobile base station, the wireless earbud stops playing sound based on audio data from the smartphone, wherein the system is configured to provide a battery status to the smartphone such that a low battery warning is displayed on the smartphone.

9. The system of claim 1, wherein the mobile base station further comprises a communication module configured to interface data communication with at least one of the smartphone and the wireless earbud.

10. The system of claim 1, wherein, in response to unplugging the wireless earbud out of the connection hole, the system is configured to initiate processing for the wireless pairing with the smartphone.

11. The system of claim 1, wherein, in response to plugging the wireless earbud into the connection hole, the at least one processor is configured to execute computer program instructions stored in the at least one memory to initiate ceasing of the wireless pairing with the smartphone.

12. The system of claim 1, wherein the at least one processor is configured to execute computer program instructions stored in the at least one memory to turn off the wireless pairing while the wireless earbud is being charged.

13. The system of claim 1, wherein the mobile base station further comprises a communication module configured to interface data communication with at least one of the smartphone and the wireless earbud.

14. The system of claim 1, wherein the at least one processor is configured to execute computer program instructions stored in the at least one memory to turn off the wireless pairing while the wireless earbud is being charged, wherein, in response to plugging the wireless earbud into the connection hole, the at least one processor is configured to execute computer program instructions stored in the at least one memory to initiate ceasing of the wireless pairing with the smartphone.

15. The system of claim 1, wherein the mobile base station further comprises a communication module configured to interface data communication with at least one of the smartphone and the wireless earbud, wherein the at least one processor is configured to determine whether the wireless earbud is plugged into the connection hole or unplugged out of the connection hole.

16. The system of claim 1, wherein the at least one processor is configured to determine whether the wireless earbud is plugged into the connection hole or unplugged out of the connection hole, wherein, when the wireless earbud is plugged into the connection hole, the smartphone is configured to wirelessly communicate with at least one of the mobile base station and the wireless earbud.

17. The system of claim 1, wherein the mobile base station further comprises a communication module configured to interface data communication with at least one of the smartphone and the wireless earbud, wherein in response to pressing the user input button, the at least one processor is configured to execute computer program instructions stored in the at least one memory to process the wireless pairing with the smartphone.

18. The system of claim 1, wherein the mobile base station further comprises a communication module configured to interface data communication with at least one of the smartphone and the wireless earbud, wherein, when the wireless earbud is plugged into the connection hole, the system is configured such that the smartphone wirelessly communicates with at least one of the mobile base station and the wireless earbud.

19. The system of claim 1, wherein the at least one processor is configured to determine whether the wireless earbud is plugged into the connection hole or unplugged out of the connection hole, wherein the mobile base station further comprises a communication module configured to interface data communication with at least one of the smartphone and the wireless earbud, wherein, when the wireless earbud is plugged into the connection hole, the system is configured such that the smartphone wirelessly communicates with at least one of the mobile base station and the wireless earbud.

20. The system of claim 1, wherein the at least one processor is configured to determine whether the wireless earbud is plugged into the connection hole or unplugged out of the connection hole, wherein, in response to unplugging the wireless earbud out of the connection hole, the system is configured to initiate processing for the wireless pairing with the smartphone.

21. A mobile system comprising:
a smartphone comprising at least one mobile application installed thereon;
a mobile apparatus comprising a main body and a wireless earbud;
the main body comprising a connection hole, a user input button, at least one processor, at least one memory, and circuitry; and
the wireless earbud configured for plugging into the connection hole of the main body to form an integrated body with the main body,
wherein, while the wireless earbud is plugged in the connection hole of the main body, the wireless earbud is configured to electrically connect with the circuitry of the main body and further configured to perform wired data communication with the main body,
wherein, while the wireless earbud is plugged in the connection hole of the main body, the circuitry of the main body is configured to obtain characteristics of the wireless earbud and send the characteristics to the at least one processor,
wherein, while the wireless earbud is plugged in the connection hole of the main body, the at least one processor is configured to execute computer program instructions stored in the at least one memory to initiate charging of a battery of the wireless earbud,
wherein the wireless earbud and the smartphone are configured to establish wirelessly pairing for wireless data communication therebetween,
wherein the mobile apparatus is configured to generate sound when the at least one mobile application is searching for the mobile apparatus while the wireless earbud and the smartphone are paired,
wherein, in response to pressing of the user input button on the main body, the at least one processor is configured to execute computer program instructions stored in the at least one memory to initiate processing for the wireless pairing,
wherein, when the wireless earbud is plugged into the connection hole of the main body, the system is configured such that the smartphone wirelessly communicates with at least one of the main body and the wireless earbud,
wherein the wireless earbud is not capable of wirelessly sending data to the main body.

22. The system of claim 21, wherein, in response to unplugging the wireless earbud out of the connection hole, the system is configured to initiate processing for the wireless pairing with the smartphone, wherein, in response to plugging the wireless earbud into the connection hole, the at least one processor is configured to execute computer program instructions stored in the at least one memory to initiate ceasing of the wireless pairing with the smartphone.

23. The system of claim 21, wherein the system is configured to such that, in response to plugging into the connection hole of the main body, the wireless earbud stops playing sound based on audio data from the smartphone, wherein the system is configured to provide a battery status to the smartphone such that a low battery warning is displayed on the smartphone, wherein the wireless earbud is configured to initiate the wireless pairing in response to unplugging out of the connection hole of the main body, wherein the system is configured such that, subsequent to unplugging out of the connection hole of the main body, the wireless earbud generates sound using audio data from the smartphone without an additional action of a user to the wireless earbud.

24. The system of claim 21, wherein the main body further comprises a communication module configured to interface data communication with the wireless earbud, wherein the main body is a wearable device.

25. A system comprising:
a mobile base station comprising a connection hole, a user input button, at least one processor, at least one memory, and circuitry; and
a wireless earbud capable of wireless pairing with a smartphone and configured for plugging into the connection hole of the mobile base station to form an integrated body with the mobile base station,
wherein, in response to pressing of the user input button of the mobile base station, the at least one processor is configured to execute computer program instructions stored in the at least one memory to initiate processing for the wireless pairing with the smartphone,
wherein, while the wireless earbud is plugged in the connection hole of the mobile base station, the wireless earbud is configured to electrically connect with the circuitry of the mobile base station and further configured to perform wired data communication with the mobile base station,
wherein, while the wireless earbud is plugged in the connection hole of the mobile base station, the at least one processor is configured to execute computer program instructions stored in the at least one memory to initiate charging of a battery of the wireless earbud,
wherein while the wireless earbud is wirelessly paired with the smartphone, the wireless earbud is configured to perform data communication with the smartphone, wherein the system is configured to generate sound when a mobile application installed on the smartphone is searching for the system while the wireless earbud is paired with the smartphone, wherein the wireless earbud is not capable of wirelessly sending data to the mobile base station.

26. The system of claim 25, wherein, in response to unplugging the wireless earbud out of the connection hole, the system is configured to initiate processing for the wireless pairing with the smartphone, wherein the at least one processor is configured to determine whether the wireless earbud is plugged into the connection hole or unplugged out of the connection hole of the mobile base station.

27. The system of claim 25, wherein, in response to plugging the wireless earbud into the connection hole of the mobile base station, the circuitry of the mobile base station is configured to obtain characteristics of the wireless earbud and send the characteristics to the at least one processor, wherein, when the wireless earbud is plugged into the connection hole, the system is configured such that the smartphone wirelessly communicates with at least one of the mobile base station and the wireless earbud.

28. The system of claim 25, wherein, in response to plugging the wireless earbud into the connection hole, the at least one processor is configured to execute computer program instructions stored in the at least one memory to initiate ceasing of the wireless pairing with the smartphone, wherein, when the wireless earbud is plugged into the connection hole, the smartphone is configured to wirelessly communicate with at least one of the mobile base station and the wireless earbud.

29. The system of claim 25, wherein the system is configured such that, subsequent to unplugging the wireless earbud out of the connection hole of the mobile base station, the wireless earbud generates sound using audio data from the smartphone without a user input to the wireless earbud.

* * * * *